(12) United States Patent
Pebay Peyroula et al.

(10) Patent No.: US 12,034,826 B2
(45) Date of Patent: Jul. 9, 2024

(54) SYSTEM AND METHOD FOR HIGH-AVAILABILITY CONTROL OF AN INDUSTRIAL PROCESS

(71) Applicant: ATOS WORLDGRID, Bezons (FR)

(72) Inventors: François Pebay Peyroula, Seyssins (FR); Christian Giraud, Vif (FR); Jean-Claude Hocquette, Crolles (FR); Jacques Anthoine, Sillingy (FR); Nicolas Bouriot, Vaulnaveys le haut (FR); Jean-Claude Tissot, Meylan (FR)

(73) Assignee: ATOS WORLDGRID, Bezons (FR)

( * ) Notice: Subject to any disclaimer, the term of this patent is extended or adjusted under 35 U.S.C. 154(b) by 0 days.

(21) Appl. No.: 18/081,574

(22) Filed: Dec. 14, 2022

(65) Prior Publication Data

US 2023/0188629 A1 Jun. 15, 2023

(51) Int. Cl.
*H04L 69/40* (2022.01)
*G05B 19/05* (2006.01)
(Continued)

(52) U.S. Cl.
CPC ............ *H04L 69/40* (2013.01); *G05B 19/052* (2013.01); *G06F 3/0481* (2013.01);
(Continued)

(58) Field of Classification Search
CPC ... H04L 67/12; H04L 1/0041; H04L 67/1097; H04L 1/0002; H04L 1/18; H04L 5/0064;
(Continued)

(56) References Cited

U.S. PATENT DOCUMENTS

| 5,673,252 A | * | 9/1997 | Johnson | ................ | G01D 4/004 |
| | | | | | 370/349 |
| 8,446,892 B2 | * | 5/2013 | Ji | ....................... | H04B 1/7143 |
| | | | | | 455/526 |

(Continued)

FOREIGN PATENT DOCUMENTS

| DE | 202005020802 | 3/2007 |
| EP | 0346804 | 12/1989 |
| WO | 2006051355 | 5/2006 |

OTHER PUBLICATIONS

European Search Report issued in EP21306770.5 on Sep. 26, 2022 (6 pages).

*Primary Examiner* — Djenane M Bayard
(74) *Attorney, Agent, or Firm* — ARC IP Law, PC; Joseph J. Mayo

(57) ABSTRACT

A high-availability control system for an industrial process including operator stations displaying information, and an interface including a pair of computers for each model, each collecting each item of data received by each controller having the model and eliminating the duplicates, wherein the computers operate in asynchronous redundancy. The system also includes a processor including a pair of computers that each receive the collected data, sort the data received as a function of their acquisition time, eliminate the duplicates and calculate an information group by acquisition time, wherein the computers operate in active redundancy. The system also includes managing the operator stations including one computer per operator station, each receiving each calculated information group and sending to the operator station each information group corresponding to the subset of information. The system also includes a duplicate communication network comprising a distributed redundancy module that manages the message exchanges between the computers.

11 Claims, 3 Drawing Sheets

(51) Int. Cl.
  *G06F 3/0481* (2022.01)
  *G06F 3/04847* (2022.01)
  *H04L 67/12* (2022.01)

(52) U.S. Cl.
  CPC .............. *G06F 3/04847* (2013.01); *G05B 2219/13144* (2013.01); *H04L 67/12* (2013.01)

(58) Field of Classification Search
  CPC ... H04L 1/0009; H04L 1/1874; H04L 67/306; H04L 1/1854; H04L 1/0076; H04L 12/66; H04L 1/0057; H04L 69/164; H04L 43/045; H04L 47/122; H04L 67/565; H04L 69/00; H04L 69/163; H04L 5/0053; H04L 5/0007; H04L 1/0061; H04L 1/16; H04L 25/03343; H04L 67/10; H04L 27/0014; H04L 5/0048; H04L 1/08; H04L 12/6418; H04L 2012/40273; H04L 5/001; H04L 5/0051; H04L 67/562; H04L 1/0003; H04L 67/566; H04L 12/2801; H04L 1/0045; H04L 43/0876; H04L 2025/03414; H04L 67/125; H04L 2001/0096; G05B 23/0221; G05B 23/0264; G05B 23/0229; G05B 23/0286; G05B 23/0291; G05B 23/0289; G05B 23/0297; G05B 23/0208
  See application file for complete search history.

(56) References Cited

U.S. PATENT DOCUMENTS

| | | | |
|---|---|---|---|
| 9,202,362 B2 * | 12/2015 | Hyland | .................. H04M 11/04 |
| 2015/0316923 A1 | 11/2015 | Strilich et al. | |
| 2015/0323910 A1 | 11/2015 | McLaughlin et al. | |

* cited by examiner

SYSTEM AND METHOD FOR HIGH-AVAILABILITY CONTROL OF AN INDUSTRIAL PROCESS

This application claims priority to European Patent Application Number 21306770.5, filed 14 Dec. 2021, the specification of which is hereby incorporated herein by reference.

BACKGROUND OF THE INVENTION

The technical field of one or more embodiments of the invention is that of systems and methods for controlling an industrial process and more particularly that of systems and methods for high-availability control of an industrial process.

One or more embodiments of the invention relates to a system for controlling an industrial process and in particular a high-availability control system of an industrial process. At least one embodiment of the invention also relates to a control method implemented by the system and a computer program-product.

DESCRIPTION OF THE RELATED ART

For the running of industrial processes operating continuously, such as, for example, the sorting process in a sorting station or else the automatic process for manufacturing a device in a factory, it is common to use a SCADA (for "Supervisory Control And Data Acquisition") architecture performing data acquisition and real-time control of an industrial process via programmable logic controllers, by calculating information from the acquired data about the state of the industrial process used for its control and supervision.

To ensure the reliability of the industrial process and therefore more particularly in the case of running critical industrial processes, such as for example the process of managing the supply of energy by an electrical network or by an electricity production plant, or water by a water treatment plant, it is essential to have recourse to a high-availability architecture, that is, a fully redundant architecture making it possible to meet availability requirements over a period of time greater than about ten years.

Existing SCADA architectures are generally non-redundant.

There are digital control or SNCC systems, but these systems can manage only a single model of high-availability controllers, and therefore a single operating mode based on the same data type and the same redundancy management.

However, many industrial processes use several different controller models, which involves managing each operating mode, that is, each type of data and each management of redundancy, in order to guarantee both a chronological coherence and a uniqueness of the data acquired by the different controller models and information calculated from the acquired data, and thus avoid performing calculations from data relating to different times of the process.

There is therefore a need for a reliable system for running an industrial process that meets the high availability requirements and is capable of managing multiple high-availability controller models by ensuring chronological coherence and uniqueness of the acquired data and the calculated information.

BRIEF SUMMARY OF THE INVENTION

At least one embodiment of the invention offers a solution to the problems mentioned above, by proposing a system for controlling an entirely redundant industrial process, meeting availability requirements greater than about ten years, comprising several fully redundant controller models and avoiding the occurrence of temporal fluctuations.

At least one embodiment of the invention relates to a high-availability control system for an industrial process comprising:

A plurality of operator stations comprising a graphical interface configured for:
  receiving instructions from an operator via the graphical interface;
  displaying at a current time and on request of the operator, a subset of information of a set of information relating to the industrial process, the set of information comprising an information group for each acquisition time from a plurality of acquisition times preceding the current time;

An interface module configured to collect data from a plurality of programmable logic controllers each having a controller model, each item of data being associated with an acquisition time from the plurality of acquisition times, the interface module including at least one pair of computers for each controller model, each computer of the pair of computers being configured for:
  collecting each item of data received by each controller having the controller model and eliminating each item of data received in duplicate;
  sending to at least one controller at least one command depending on the collected data and/or instructions provided by the operator; the computers of the interface module operating in asynchronous redundancy;

A processing module including a pair of computers, each computer of the pair of computers being configured for:
  receiving from each computer of the interface module at least a portion of the collected data;
  sorting the received data according to their acquisition time and eliminating data received in duplicate;
  calculating for each acquisition time the corresponding information group from the corresponding sorted data;

the computers of the processing module operating in active redundancy,

A module for managing the operator stations including a computer for each operator station, each computer being configured for:
  receiving each calculated information group;
  sending to the corresponding operator station each information group corresponding to the requested subset of information;
  managing the graphical interface of the corresponding operator station;

A dual communication network having different first and second channels, comprising a redundancy module distributed over each computer of the system, each computer of the system being configured for:
  sending, to the redundancy module, each message intended for at least one other computer of the system, simultaneously on the first and second channels;
  receiving each message intended for it from the redundancy module and sending an acknowledgment to the redundancy module;
the redundancy module being configured for:
  receiving the message sent via the first channel and/or via the second channel;

deleting the message received via the second channel if the message has been received via the first channel;

modifying the received message by adding an acknowledgment request;

disseminating to the other computer of the system the modified message simultaneously on the first channel and the second channel.

By way of one or more embodiments of the invention, a pair of computers of the interface module retrieves the data acquired by a single controller technology and eliminates duplicates, which allows the decoupling between the management of the redundancy of each controller technology and the management of redundancy by the system according to one or more embodiments of the invention. At the interface module, redundancy is provided by each pair of computers operating in asynchronous redundancy, that is, each computer carries out the same tasks on the data assigned to it without synchronization with the other computers.

The pair of computers of the processing module retrieves the data acquired by each pair of computers from the interface module and orders them chronologically, eliminating the duplicates, which makes it possible to ensure the chronological coherence and uniqueness of the data. The information necessary for the control of the process is then calculated from the sorted and therefore temporally coherent data. At the processing module, redundancy is provided by the pair of computers operating in active redundancy, that is, performing the same tasks simultaneously and sending only the information calculated by one of the computers.

Each computer of the module for managing the operator stations retrieves the calculated information and sends the associated operator station the information requested by the operator. Each operator station being identical, redundancy is ensured at the operator stations.

Following the display of the requested information, the operator can provide an instruction via the graphical interface of an operator station to modify the control of the industrial process. The instruction is transmitted to at least one controller concerned via a command transmitted by the pair of computers of the corresponding interface module.

During communications between computers, the redundancy is ensured by the duplication of the communication network and the chronological coherence is ensured by the redundancy module using an acknowledgment mechanism to ensure the proper simultaneous reception of the messages by the set of recipient computers.

The chronological coherence and the uniqueness of the data and information, as well as the redundancy are therefore ensured at each point of the system, which therefore meets the high-availability and reliability requirements.

In addition to the features mentioned in the preceding paragraph, the method according to one or more embodiments of the invention may have one or more additional features from the following, taken individually or according to any technically plausible combinations.

According to at least one embodiment, the system according to one or more embodiments of the invention further includes a database distributed over at least a portion of the computers of the system, configured to store and manage the data and the information.

Thus, the database distributed over the computers of the system manages a coherent view of all the data and information representative of the state of the industrial process, guaranteeing against any risk of time fluctuation.

According to at least one embodiment of the invention, the system further comprises a current time module including a plurality of computers, each computer of the current time module being configured for:

replicating at least a portion of the data and the information of the processing module;

providing for the module for managing the operator stations, the data and the replicated information corresponding to the acquisition time immediately preceding the current time; the computers of the current time module operating in functional redundancy.

Thus, the computers of the current time module manage the data relating to the current time and therefore the modifications to be made to the display of the operator stations in real time and thus offload the computers of the module for managing the operator stations. At the current time module, redundancy is provided by the plurality of computers operating in functional redundancy, that is, performing the same tasks simultaneously.

According to at least one embodiment of the invention, the system further includes an archiving module including a plurality of computers, each computer of the archiving module being configured for:

replicating and archiving a portion of the data and the information from the processing module;

providing to the module for managing the operator stations the data and the archived information corresponding to each acquisition time preceding the acquisition time immediately preceding the current time.

Thus, the computers of the archiving module manage the data to be displayed not relative to the current time, that is, the archival data, and thus offload the computers of the module for managing the operator stations. At the archiving module, redundancy is provided by the plurality of computers operating in functional redundancy.

According to at least one embodiment of the invention, the portion of the collected data received by each computer of the processing module corresponds to the data collected by each computer of the modified interface module between two successive acquisition times.

Thus, the system operates in event mode, that is, only the data and information modified between two successive times are transmitted, which makes it possible to reduce traffic in the system.

At least one embodiment of the invention relates to a method for controlling an industrial process implemented by the system according to one or more embodiments of the invention, comprising the following steps:

For each computer of each pair of computers of the interface module, collecting each item of data received by each controller having a corresponding controller model and eliminating each item of data received in duplicate, each item of data being associated with an acquisition time preceding a current time;

Receiving by each computer of the processing module, at least some of the data collected by the interface module, sorting the received data according to their acquisition time, eliminating the duplicate received data and calculating an information group for each acquisition time from the corresponding sorted data;

Receiving by each computer of the module for managing the operator stations, each calculated information group and sending to each operator station, each received information group comprised in an information subset requested by an operator;

Displaying the requested subset of information by each operator station at the current time;

If the operator provides an instruction via the graphical interface of an operator station, sending the instruction to the interface module;

Sending, by the interface module, at least one command dependent on the data received and/or the instruction to at least one controller;

each step of receiving by a computer of the system including an exchange of at least one message between the computer and another computer of the system including the following sub-steps:

Simultaneous sending on the first channel and on the second channel of the communication network, the message by the computer to the redundancy module;

Receiving, by the redundancy module, the message sent;

If the message is received via the first channel and via the second channel, deleting by the redundancy module the message received via the second channel;

Modifying by the redundancy module the message received by adding an acknowledgment request;

Simultaneously disseminating the modified message on the first channel and on the second channel to the other computer by the redundancy module;

Receiving the modified message by the other computer and sending an acknowledgment to the redundancy module.

According to at least one embodiment of the invention, the method further comprises the following steps carried out by each computer of the current time module:

Replicating at least some of the data and the information from the processing module;

Sending to each computer of the module for managing the operator stations, replicated data and information corresponding to the acquisition time immediately preceding the current time.

According to at least one embodiment of the invention, the method further comprises the following steps carried out by each computer of the archiving module:

Replicating and archiving of at least some of the data and the information from the processing module;

Sending to each computer of the module for managing the operator stations, archived data and information corresponding to each acquisition time preceding the acquisition time immediately preceding the current time.

According to at least one embodiment of the invention, each step of sending by a computer of the system comprises an exchange of at least one message between the computer and at least one other computer of the system including the following sub-steps:

Simultaneously sending the message on the first channel and the second channel of the communication network by the computer to the redundancy module;

Receiving, by the redundancy module, the message sent;

If the message is received via the first channel and via the second channel, deleting by the redundancy module the message received via the second channel;

Modifying by the redundancy module the message received by adding an acknowledgment request;

Simultaneous disseminating the modified message on the first channel and the second channel to the other computer by the redundancy module;

Receiving the modified message by the other computer and sending an acknowledgment to the redundancy module.

At least one embodiment of the invention relates to a computer program-product comprising instructions which, when the software is executed by a computer, enable the latter to implement the steps of the method according to one or more embodiments of the invention.

According to at least one embodiment of the invention, the computer program-product is written in ADA language.

Thus, the computer program-product is independent of the hardware of the computers on which it is implemented.

One or more embodiments of the invention and its different applications will be better understood upon reading the following disclosure and examining the accompanying figures.

BRIEF DESCRIPTION OF THE DRAWINGS

The figures are presented by way of reference and are in no way limiting to the one or more embodiments of the invention.

DETAILED DESCRIPTION OF THE INVENTION

Unless otherwise stated, the same element appearing in different figures has the same reference.

At least one embodiment of the invention relates to a high-availability system allowing the running or control of an industrial process.

"Control of an industrial process" is understood to mean the method used to govern the operation of the industrial process.

The industrial process may be a critical industrial process, such as, for example, the process of managing power supply by an electrical network or by an energy production plant or the process of managing water supply by a water treatment plant, or a non-critical industrial process, such as for example the sorting process in a sorting station or even the automatic process for manufacturing a device in a plant.

"Availability" means the property of a system capable of ensuring its functions without interruption, delay or degradation, at the time the request is made.

In one or more embodiments of the invention, the functions provided by the high-availability system are linked to the control of an industrial process.

"High-availability system" means a system capable of meeting the availability requirements over a period of time greater than about ten years.

To obtain a high-availability system, the system must be entirely redundant, that is, arranged with additional devices or functions intended to allow the resumption of operation in the event of failure or unavailability of any device or main function.

Figure 1:
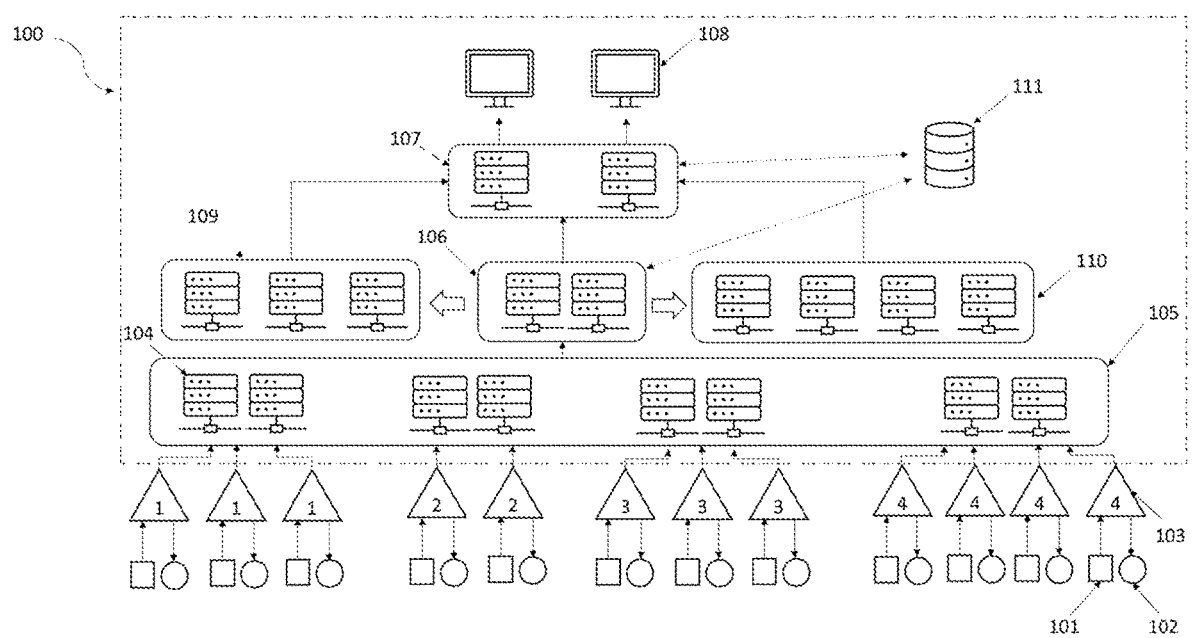
FIG. 1 shows a schematic depiction of an information system according to one or more embodiments of the invention.

FIG. 1 shows a schematic depiction of an information system 100 according to one or more embodiments of the invention.

The system 100 includes:
- A plurality of operator stations 108 comprising a graphical interface;
- An interface module 105;
- A processing module 106 including a pair of computers 104;
- A module for managing the operator stations 107 including one computer 104 per operator station 108.

The interface module 105 is configured to interface with a plurality of high-availability programmable industrial controllers 103, each having a controller model. The interface module 105 comprises at least one pair of computers 104 for each controller model.

In FIG. 1, the system 100 interfaces with twelve controllers 103 represented by triangles, three controllers 103 having a controller model 1 controller, two controllers 103 having a controller model 2, three controllers 103 having a controller model 3 and four controllers 103 having a controller model 4.

In FIG. 1, the interface module 105 includes a pair of computers per controller model, that is, a first pair of computers 104 interfacing with the controllers 103 having the controller model 1, a second pair of computers 104 interfacing with the controllers 103 having the controller model 2, a third pair of computers 104 interfacing with the controllers 103 having the controller model 3 and a fourth pair of computers 104 interfacing with the controllers 103 having the controller model 4.

The interface module 105 could include a plurality of pairs of computers 104 per controller model.

Each controller 103 communicates with at least one sensor 101 and at least one actuator 102.

In FIG. 1, twelve sensors 101 represented by squares and twelve actuators 102 represented by circles can be seen and each controller 103 communicates with a sensor 101 and an actuator 102.

Each controller 103 could communicate with a plurality of sensors 101 and/or a plurality of actuators 102.

In FIG. 1, the system 100 includes two operator stations 108, therefore the module for managing the operator stations 107 includes two computers 104.

The computers 104 of the interface module 105 operate in asynchronous redundancy, that is, each computer 104 of a pair of computers 104 carries out the same tasks as the other computer 104 of the pair of computers 104 without synchronization between them and each pair of computers 104 carries out the same tasks as the other pair of computers 104 without synchronization between them.

The pair of computers 104 of the processing module 106 operate in active redundancy, that is, each computer 104 performs the same tasks as the other computer 104 in total synchronization but only one of the two computers 104 communicates results to the rest of the system 100.

Figure 5:
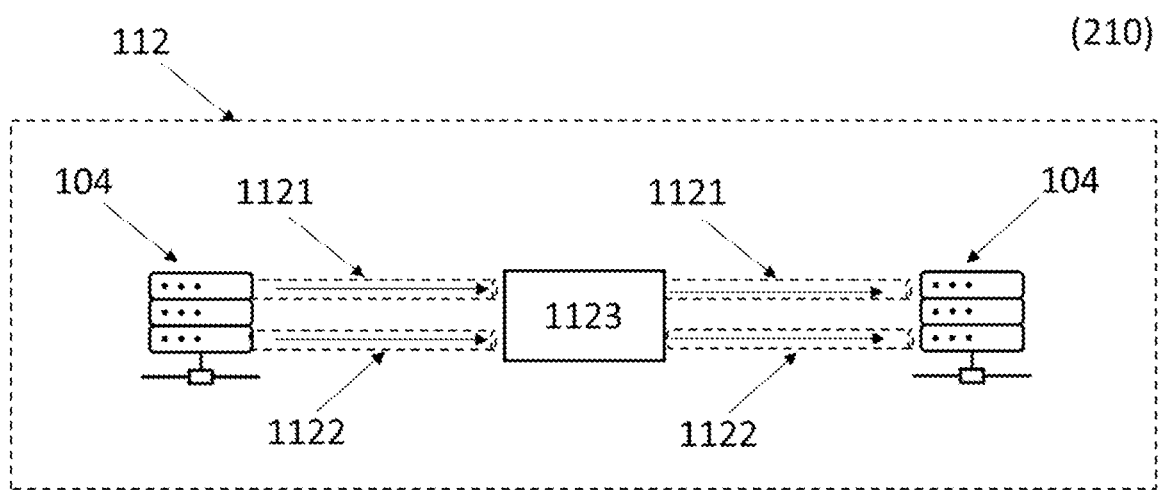
FIG. 5 shows a schematic representation of the exchange of a message between a computer and at least one other computer, according to one or more embodiments of the invention.

FIG. 5 shows a schematic representation of the operation of communications between computers 104 within the system 100 according to one or more embodiments of the invention.

The system 100 includes a dual communication network 112 having a first channel 1121 and a second channel 1122 independent of one another and including a redundancy module 1123 distributed over the computers 104 of the system 100.

The communication network 112 is for example a dual Ethernet network.

The system 100 may also include:
- A database 111 distributed over at least a portion of the computers 104;
- A current time module 109 including a plurality of computers 104;
- An archiving module 110 including a plurality of computers 104.

In FIG. 1, the database 111 is distributed over the computers 104 of the processing module 106 and over the computers 104 of the module for managing the operator stations 107, but the database 111 could also be distributed over other computers 104, for example over the computers 104 of the interface module 105.

The database 111 may also be distributed over all the computers 104 of the system 100.

The database 111 may also be distributed over the computers 104 of the current time module 109 and/or over the computers 104 of the archiving module 110.

The computers 104 of the current time module 109 operate in functional redundancy, that is, the tasks are performed simultaneously by each computer 104 of the current time module 109.

The computers 104 of the archiving module 110 operate in functional redundancy.

In FIG. 1, the current time module 109 includes three computers 104, but it could include any other number of computers 104.

In FIG. 1, the archiving module 110 includes four computers 104, but it could include any other number of computers 104.

The system 100 can also include an administration station not shown in the figures, in which an operating system is installed, and an administration module configured to manage the link between the computers 104 of the system 100 and the administration station, that is, to form the interface between the system 100 and the administration station.

The administration station is distinct from the operator stations 108.

At least one embodiment of the invention relates to a method for controlling an industrial process implemented by the system 100 according to one or more embodiments of the invention.

Figure 2:
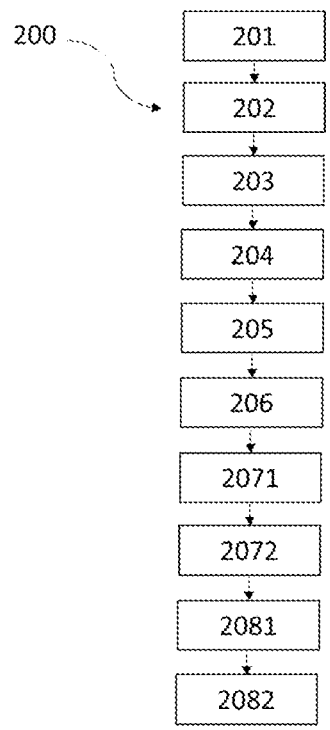
FIG. 2 is a block diagram showing the sequence of steps of a method according to one or more embodiments of the invention.

FIG. 2 is a block diagram showing the sequence of steps of the method 200 according to one or more embodiments of the invention.

A first step 201 of the method 200 consists, for each computer 104 of each pair of computers 104 of the interface module 105, in collecting a plurality of data from each controller 103 having the same controller model associated with the pair of computers 104 and eliminating any data received in duplicate, each item of data being associated with an acquisition time preceding a current time.

Figure 3:
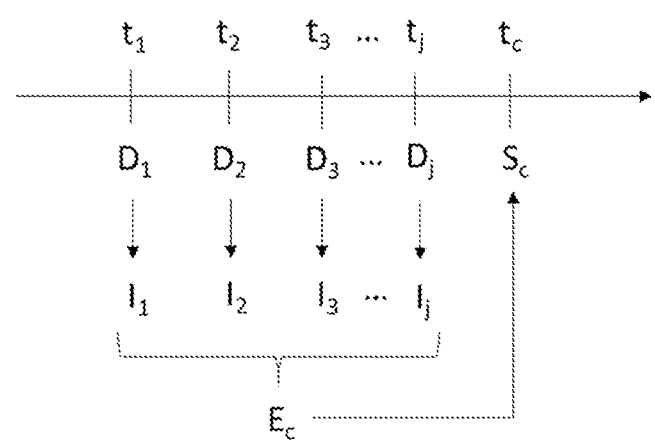
FIG. 3 shows the acquired data and the information calculated by the method according to one or more embodiments of the invention as a function of time.

FIG. 3 shows the data $D_1$ acquired as a function of time, according to one or more embodiments of the invention.

In FIG. 3, at least one first item of data $D_1$ is associated with a first acquisition time $t_1$, at least one second item of data $D_2$ is associated with a second acquisition time $t_2$, at least one third item of data $D_3$ is associated with a third acquisition time $t_3$ and at least one $j^{th}$ data $D_j$ is associated with a $j^{th}$ acquisition time $t_j$, the $j^{th}$ acquisition time $t_j$ being the last acquisition time preceding the current time $t_c$.

The time interval between two successive acquisition times may be fixed or variable.

For example, a first controller 103 receives for example the first item of data $D_1$ and the third item of data $D_3$ and a second controller 103 receives the second item of data $D_2$ and the $j^{th}$ item of data $D_j$. If the first controller 103 has a first controller model and the second controller 103 has a second controller model 103, a first pair of computers 104 of the interface module 105 collects the first item of data $D_1$ and the third item of data $D_3$ and a second pair of computers 104 of the interface module 105 collects the second item of data $D_2$ and the $j^{th}$ item of data $D_j$.

Taking the example of FIG. 1, the first step 201 consists, for the first pair of computers 104 of the interface module 105, in collecting the data $D_i$ received by each controller 103 having the model 1 controller, for the second pair of computers 104 of the interface module 105 in collecting the data $D_i$ received by each controller 103 having the model 2 controller, for the third pair of computers 104 of the interface module 105 in collecting the data $D_i$ received by each controller 103 having the model 3 controller and for the fourth pair of computers 104 of the interface module 105 in collecting the data $D_i$ received by each controller 103 having the model 4 controller.

Each computer 104 of the interface module 105 collects for example each item of data $D_i$ received by each controller 103 at a collection time immediately following the acquisition time $t_i$, that is to say the transmission of the data $D_i$ is carried out in real time between each controller 103 and each computer 104 of the interface module 105.

A second step 202 of the method 200 consists, for each computer 104 of the processing module 106, in receiving at least part of the data $D_i$ collected by the interface module 105 in the first step 201, that is, in receiving all the data $D_i$ collected by the interface module 105 or only a portion of the data $D_i$ collected by the interface module 105.

Part of the data $D_i$ corresponds for example to the data $D_i$ collected by each computer 104 of the interface module 105 modified between two successive acquisition times $t_i$.

Returning to the previous example, each computer 104 of the processing module 106 for example receives the first item of data $D_1$ and the third item of data $D_3$ from the first pair of computers 104 and the second item of data $D_2$ and the $j^{th}$ item of data $D_j$ from the second pair of computers 104.

Each computer 104 of the processing module 106 receives for example each item of data $D_i$ collected at a reception time immediately following the collection time, that is, the transmission of the data $D_i$ is performed in real time between each computer 104 of the processing module 106 and each computer 104 of the interface module 105.

The second step 202 then consists, for each computer 104 of the processing module 106, in sorting the data $D_i$ received as a function of their acquisition time $t_i$, that is, in chronologically ordering the data $D_i$ received, then eliminating the duplicate $D_i$ data received.

Returning to the previous example, each computer 104 of the processing module 106 sorts the data $D_i$ received in the following order: the first item of data $D_1$, the second item of data $D_2$, the third item of data $D_3$ and the $j^{th}$ item of data $D_j$.

Finally, for each computer 104 of the processing module 106, the second step 202 consists in calculating for each acquisition time $t_i$, an information group $I_i$ from corresponding sorted data $D_i$.

Each information group $I_i$ includes at least one item of information $I_i$ depending on at least one item of data $D_i$ acquired at the acquisition time $t_i$. For example, an item of information $I_i$ may depend on an item of data acquired at the acquisition time $t_i$ and on the same item of data acquired at the acquisition time $t_{i-1}$ immediately preceding the acquisition time $t_i$.

By taking the example of FIG. 3, the second step 202 consists in calculating a first information group $I_1$ for the first acquisition time $t_1$, a second information group $I_2$ for the second acquisition time $t_2$, a third information group $I_3$ for the third acquisition time $t_3$ and a $j^{th}$ information group for the $j^{th}$ acquisition time $t_j$.

A third step 203 of the method 200 consists, for each computer 104 of the module for managing the operator stations 107, in receiving each information group $I_i$ calculated in the second step 202.

Taking the example of FIG. 3, the third step 203 consists, for each computer 104 of the module for managing the operator stations 107, in receiving the first information group $I_1$, the second information group $I_2$, the third information group $I_3$ and the $j^{th}$ information group $I_j$.

Each computer 104 of the module for managing the operator stations 107 receives for example each information group $I_i$ calculated at a reception time immediately following a calculation time of the information group $I_i$, that is to say the transmission of the information groups $I_i$ is performed in real time between each computer 104 of the processing module 106 and each computer 104 of the module for managing the operator stations 107.

The third step 203 of the method 200 then consists, for each computer 104 of the module for managing the operator stations 107, in sending to the corresponding operator station 108 each information group $I_i$ received included in a subset of information $S_c$ requested by an operator.

Information subset $S_c$ comprises at least part of the information $I_i$ comprised in an information set $E_c$ comprising each calculated information group $I_i$.

Each computer 104 of the module for managing the operator stations 107 sends, for example, each information group $I_i$ at a sending time immediately following the time of reception of the information group $I_i$, that is to say, the transmission of the information groups $I_i$ is performed in real time between each computer 104 of the module for managing the operator stations 107 and each operator station 108.

A fourth step 204 of the method 200 consists, for each operator station 108, in displaying the subset of information $S_c$ requested at the current time $t_c$.

Each operator station 108 of the system 100 provides the same information $I_i$ to the operator.

A fifth step 205 of the method 200 is carried out if the operator supplies an instruction via the graphical interface of a given operator station 108. The fifth step 205 consists, for the given operator station 108, in sending the received instruction to the interface module 105.

A sixth step 206 of the method 200 consists, for the interface module 105, in sending at least one command dependent on the data $D_i$ received at the first step 201 and/or the instruction received in the fifth step 205 to at least one controller 103.

The controller 103 can then send the command to at least one corresponding actuator 102.

The command may therefore depend on the information $I_i$ computed from the data $D_i$ received.

For example, if the interface module 105 receives at the fifth step 205 an instruction requesting to switch off an actuator 102 $i$, the sixth step 206 consists in the interface module 105 sending a command to the controller 103 $j$ configured to send commands to the actuator 102 $i$.

In the case where the system 100 includes the current time module 109, the method 200 includes a seventh step 2071 and an eighth step 2072 carried out by each computer 104 of the current time module 109.

The seventh step 2071 consists in replicating at least a portion of the data $D_i$ and information $I_i$ from the processing module 105, that is, a part of the data $D_i$ and information $I_i$ from the processing module 105 or all of the data $D_i$ and information $I_i$ from the processing module 105.

Part of the data $D_i$ and information $I_i$ from the replicated processing module 105 includes for example the data $D_i$ and information $I_i$ relating to the acquisition time $t_j$ immediately preceding the current time $t_c$.

"Replication" means sharing information to ensure consistency of data among several redundant data sources.

The eighth step 2072 consists in sending to each computer 104 of the module for managing the operator stations 107, the data $D_i$ and information $I_i$ replicated at the seventh step 2071 relating to the acquisition time $t_j$ immediately preceding the current time $t_c$.

In FIG. 3, the acquisition time $t_j$ immediately preceding the current time $t_c$ is the $j^{th}$ acquisition time $t_j$.

In the case where the system 100 includes the archiving module 110, the method 200 includes a ninth step 2081 and a tenth step 2082 carried out by each computer 104 of the archiving module 110.

The ninth step 2081 consists in replicating and archiving a part of the data $D_i$ and information $I_i$ from the processing module 105, that is, a part of the data $D_i$ and information $I_i$ from the processing module 105 or all of the data $D_i$ and information $I_i$ from the processing module 105.

Part of the data $D_i$ and information $I_i$ from the archived processing module 105 comprises for example the data $D_i$ and information $I_i$ relating to each acquisition time $t_i$ preceding the acquisition time $t_j$ immediately preceding the current time $t_c$.

The tenth step 2082 consists in sending to each computer 104 of the module for managing the operator stations 107, the data $D_i$ and information $I_i$ archived in the ninth step 2081 relating to each acquisition time $t_i$ preceding the acquisition time $t_j$ immediately preceding the current time $t_c$.

In FIG. 3, the acquisition time $t_j$ immediately preceding the current time $t_c$ is the $j^{th}$ acquisition time $t_j$ therefore the tenth step 2082 consists in sending the data $D_i$ and information $I_i$ relating to the first acquisition time $t_1$, at the second acquisition time $t_2$, at the third acquisition time $t_3$ and in general at all the other acquisition times $t_i$ preceding the $j^{th}$ acquisition time $t_j$.

In the method 200, each step of receiving by a computer 104, that is, the second step 202 and the third step 203, and each step of sending by a computer 104, that is, the eighth step 2072 and the tenth step 2082, includes an exchange of at least one message between a sending computer 104 and at least one other receiving computer 104.

Figure 4:
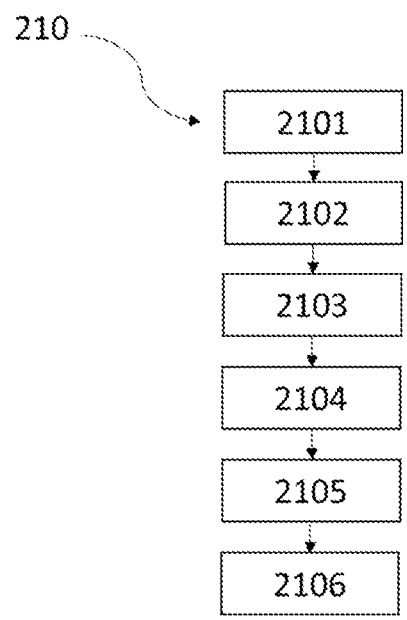
FIG. 4 is a block diagram illustrating the sequence of the sub-steps of a step of the method according to one or more embodiments of the invention comprising the exchange of a message between a computer and at least one other computer.

FIG. 4 is a block diagram showing the sequence of sub-steps of an exchange 210, according to one or more embodiments of the invention.

A first sub-step 2101 of the exchange 210 consists in the sending computer 104 sending the message simultaneously on the first channel 1121 and the second channel 1122 of the communication network 112 to the redundancy module 1123.

A second sub-step 2102 of the exchange 210 consists in the redundancy module 1123 receiving the message sent.

If in the second sub-step 2102, the redundancy module 1123 receives the message via the first channel 1121 and via the second channel 1122, and therefore receives the duplicate message, a third sub-step 2103 of the exchange 210 consists in the redundancy module 1123 deleting the message received via the second channel 1122.

A fourth sub-step 2104 of the exchange 210 consists in the redundancy module 1123 modifying the message received by adding an acknowledgment request.

A fifth sub-step 2105 of the exchange 210 consists in the redundancy module 1123 disseminating the modified message simultaneously on the first channel 1121 and the second channel 1122 of the communication network 112 to the destination computer(s) 104.

A sixth sub-step 2106 of the exchange 210 consists in each recipient computer 104 receiving the modified message and sending an acknowledgment to the redundancy module 1123. The database 111 is configured to store and manage the data $D_i$ and information $I_i$ used by computers 104 on which it is distributed.

What is claimed is:

1. A system for high-availability control of an industrial process comprising:
    a plurality of computers;
    a plurality of operator stations comprising a graphical interface with a display configured to
        receive instructions from an operator via the graphical interface,
        display, on said display, at a current time and on request from the operator,
            a subset of information of an information set relating to the industrial process, the information set comprising an information group for each acquisition time from a plurality of acquisition times preceding the current time;
    an interface configured to collect data from a plurality of programmable logic controllers each having a controller model, wherein each item of data from said data is associated with an acquisition time from the plurality of acquisition times,
        wherein the interface comprises at least one pair of computers of said plurality of computers for each controller model,
        wherein each computer of the at least one pair of computers of said interface configured to
            collect said each item of data received by each controller of the plurality of programmable logic controllers having the controller model and eliminating each duplicate data received;
            send to at least one controller of the plurality of programmable logic controllers, one or more of at least one data-dependent command collected and the instructions provided by the operator;
                wherein the at least one pair of computers of the interface operate in asynchronous redundancy;
    a processor including a pair of computers of the plurality of computers, wherein each computer of the pair of computers of the processor are configured to
        receive from each computer of the at least one pair of computers of the interface at least a portion of the data that is collected;
        sort the data that is received as a function of the acquisition time and eliminate the each duplicate data that is received;
        calculate for said each acquisition time, corresponding information group from the data that is sorted;
            wherein the pair of computers of the processor operate in active redundancy;
    a computer of said plurality of computers each associated with each operator station of the plurality of operator stations to manage the plurality of operator stations, wherein said computer that is associated with said each operator station is configured to
        receive each information group that is calculated;

send to a corresponding operator station of the plurality of operator stations each information groups corresponding to the subset of information that is requested;

manage the graphical interface of the corresponding operator station;

a duplicate communication network comprising a first channel, a second channel that is separate from the first channel, a redundancy device distributed over each computer of the plurality of computers of the system, wherein each computer of the plurality of computers of the system is configured to send to the redundancy device each message intended for at least one other computer of the plurality of computers of the system simultaneously on the first channel and the second channel;

receive said each message intended for the redundancy device and send an acknowledgment to the redundancy device;

wherein the redundancy device is configured to receive the each message sent via one or more of the first channel and the second channel;

delete the each message received via the second channel if the each message has been received via the first channel;

modify the each message that is received by adding an acknowledgment request;

disseminate the each message that is modified to the at least one other computer of the plurality of computers of the system simultaneously on the first channel and the second channel.

2. The system according to claim 1, further comprising a database distributed over at least a portion of the plurality of computers of the system, wherein the database is configured to store and manage the data and the information set.

3. The system according to claim 1, further comprising a current time module including a plurality of computers of the plurality of computers of the system, wherein each computer of the current time module is configured to replicate at least the portion of the data and the information set from the processor;

provide the computer of said plurality of computers each associated with each operator station the data that is replicated and the information set that corresponds to the acquisition time immediately preceding the current time;

wherein the plurality of computers of the current time module operate in functional redundancy.

4. The system according to claim 1, further comprising an archiver including a plurality of computers of the plurality of computers of the system, wherein each computer of the plurality of computers of the archiver is configured to replicate and archive the portion of the data and the information set of the processor;

provide the computer of said plurality of computers each associated with each operator station the data that is archived and the information set that corresponds to each acquisition time preceding the acquisition time immediately preceding the current time;

wherein the plurality of computers of the archiver operate in operational redundancy.

5. The system according to claim 1, wherein the portion of the data that is collected by said each computer of the processor corresponds to the data that is collected by said each computer of the interface modified between two successive acquisition times.

6. A method for controlling an industrial process implemented by a system for high-availability control of the industrial process, wherein the system comprises a plurality of computers, a plurality of operator stations comprising a graphical interface with a display configured to receive instructions from an operator via the graphical interface;

display, on said display, at a current time and on request from the operator, a subset of information of an information set relating to the industrial process, the information set comprising an information group for each acquisition time from a plurality of acquisition times preceding the current time, an interface configured to collect data from a plurality of programmable logic controllers each having a controller model, each item of data from said data being associated with an acquisition time from the plurality of acquisition times, wherein the interface includes at least one pair of computers of said plurality of computers for each controller model, a processor including a pair of computers of the plurality of computers, a computer of said plurality of computers of the system each associated with each operator station of the plurality of operator stations to manage the plurality of operator stations, and a duplicate communication network comprising a first channel, a second channel that is separate from the first channel, and a redundancy device distributed over each computer of the plurality of computers of the system;

wherein the method comprises:

for each computer of each pair of computers of the at least one pair of computers of the interface, collecting said each item of data that is received by each controller of the plurality of programmable logic controllers having a corresponding controller model and eliminating each duplicate data received, wherein said each item of data is associated with an acquisition time from the plurality of acquisition times preceding the current time;

receiving by each computer of the pair of computers of the processor at least a portion of the data that is collected by the interface, sorting the data that is received as a function of the acquisition time, eliminating the each duplicate data that is received and calculating said information group for said each acquisition time from the data that is sorted;

receiving by said each computer of said plurality of computers each associated with each operator station of the plurality of operator stations, each information group that is calculated and sending to said each operator station, said each information group that is received in a subset of information that is requested by said operator;

displaying, on said display, the subset of information that is requested by said each operator station at the current time;

if the operator provides an instruction via the graphical interface of an operator station of the plurality of operator stations, sending the instruction to the interface;

sending by the interface at least one data-dependent command that is one or more of received and from the instruction to at least one controller of the plurality of programmable logic controllers;

exchanging of at least one message between a first computer and a second computer of the plurality of computers of the system, wherein said exchanging comprises
   simultaneously sending on the first channel and the second channel of the duplicate communication network, the at least one message by the second computer to the redundancy device;
   receiving, by the redundancy device, the at least one message that is sent;
   if the at least one message is received via the first channel and via the second channel, deleting by the redundancy device the at least one message that is received via the second channel;
   modifying by the redundancy device, the at least one message that is received by adding an acknowledgment request;
   simultaneously disseminating on the first channel and the second channel, the at least one message that is modified to the second computer by the redundancy device;
   receive the at least one message by the second computer and sending an acknowledgment to the redundancy device.

7. The method according to claim 6, further comprising, by said each computer,
   replicating said at least the portion of the data and the information set from the processor;
   sending to said computer of said plurality of computers each associated with each operator station of the plurality of operator stations, the data that is replicated and the information set that corresponds to the acquisition time immediately preceding the current time.

8. The method according to claim 7, further comprising exchanging of at least one other message between the first computer of the plurality of computers of the system and at least said second computer of the plurality of computers of the system, wherein said exchanging comprises
   simultaneously sending on the first channel and the second channel of the duplicate communication network, the at least one other message by the first computer to the redundancy device;
   receiving by the redundancy device, the at least one other message that is sent;
   if the at least one other message is received via the first channel and via the second channel, deleting by the redundancy device the at least one other message that is received via the second channel;
   modifying by the redundancy device, the at least one other message that is received by adding an acknowledgment request;
   simultaneously disseminating on the first channel and the second channel, the at least one other message that is modified to the at least said second computer by the redundancy device;
   receiving the at least one other message that is modified by the at least said second computer and sending an acknowledgment to the redundancy device.

9. The method according to claim 6, further comprising an archiver including a plurality of computers of the plurality of computers of the system, wherein via said each computer of the plurality of computers of the archiver, further comprising
   replicating and archiving said at least the portion of the data and the information set from the processor;
   sending to said computer of said plurality of computers each associated with each operator station of the plurality of operator stations, the data that is archived and the information set that corresponds to each acquisition time preceding the acquisition time immediately preceding the current time.

10. A non-transitory computer program-product comprising instructions which, when executed on a plurality of computers, enable the plurality of computers to implement a method for controlling an industrial process implemented by a system for high-availability control of the industrial process, wherein the system comprises
   said plurality of computers,
   a plurality of operator stations comprising a graphical interface with a display configured to
     receive instructions from an operator via the graphical interface;
     display, on said display, at a current time and on request from the operator,
       a subset of information of an information set relating to the industrial process, the information set comprising an information group for each acquisition time from a plurality of acquisition times preceding the current time,
   an interface configured to collect data from a plurality of programmable logic controllers each having a controller model, each item of data from said data being associated with an acquisition time from the plurality of acquisition times, wherein the interface includes at least one pair of computers of said plurality of computers for each controller model,
   a processor including a pair of computers of the plurality of computers,
   a computer of said plurality of computers of the system each associated with each operator station of the plurality of operator stations to manage the plurality of operator stations, and
   a duplicate communication network comprising a first channel, a second channel that is separate from the first channel, and a redundancy device distributed over each computer of the plurality of computers of the system;
wherein the method comprises:
   for each computer of each pair of computers of the at least one pair of computers of the interface, collecting said each item of data that is received by each controller of the plurality of programmable logic controllers having a corresponding controller model and eliminating each duplicate data received, wherein said each item of data is associated with an acquisition time from the plurality of acquisition times preceding the current time;
   receiving by each computer of the pair of computers of the processor at least a portion of the data that is collected by the interface, sorting the data that is received as a function of the acquisition time, eliminating the each duplicate data that is received and calculating said information group for said each acquisition time from the data that is sorted;
   receiving by said computer of said plurality of computers each associated with each operator station of the plurality of operator stations, each information group that is calculated and sending to said each operator station, said each information group that is received in a subset of information that is requested by said operator;
   displaying, on said display, the subset of information that is requested by said each operator station at the current time;
   if the operator provides an instruction via the graphical interface of an operator station of the plurality of operator stations, sending the instruction to the interface;

sending by the interface at least one data-dependent command that is one or more of received and from the instruction to at least one controller of the plurality of programmable logic controllers;

exchanging of at least one message between a first computer and a second computer of the plurality of computers of the system, wherein said exchanging comprises simultaneously sending on the first channel and the second channel of the duplicate communication network, the at least one message by the second computer to the redundancy device;

receiving, by the redundancy device, the at least one message that is sent;

if the at least one message is received via the first channel and via the second channel, deleting by the redundancy device the at least one message that is received via the second channel;

modifying by the redundancy device, the at least one message that is received by adding an acknowledgment request;

simultaneously disseminating on the first channel and the second channel, the at least one message that is modified to the second computer by the redundancy device;

receive the at least one message by the second computer and sending an acknowledgment to the redundancy device.

11. The non-transitory computer program-product according to claim 10, wherein the computer-program product is written in ADA language.

* * * * *